(12) United States Patent
Hayashi (10) Patent No.: US 11,981,546 B2
(45) Date of Patent: May 14, 2024

(54) WORK VEHICLE HAVING AN OPERATION TERMINAL THAT PROVIDES A SENSE OF DIRECTION FOR AN OPERATOR

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 926 days.

(21) Appl. No.: 16/977,391

(22) PCT Filed: Mar. 8, 2019

(86) PCT No.: PCT/JP2019/009281
§ 371 (c)(1),
(2) Date: Sep. 1, 2020

(87) PCT Pub. No.: WO2019/172408
PCT Pub. Date: Sep. 12, 2019

(65) Prior Publication Data
US 2021/0061621 A1     Mar. 4, 2021

(30) Foreign Application Priority Data
Mar. 9, 2018     (JP) .................................. 2018-043249

(51) Int. Cl.
*B66C 13/16*     (2006.01)
*B66C 13/40*     (2006.01)
(Continued)

(52) U.S. Cl.
CPC .............. *B66C 13/16* (2013.01); *B66C 13/40* (2013.01); *G06T 3/60* (2013.01); *G06T 7/70* (2017.01);
(Continued)

(58) Field of Classification Search
CPC . B66C 13/16; B66C 13/40; B66C 2700/0371; B66C 13/46; G06T 3/60;
(Continued)

(56) References Cited

U.S. PATENT DOCUMENTS 10,730,725 B2 *   8/2020   Ishikawa ................. B66C 13/46
11,427,988 B2 *   8/2022   Takahama ............ H04N 13/122
(Continued)

FOREIGN PATENT DOCUMENTS

JP     2016-179889 A     10/2016
JP     2017-065911 A      4/2017

OTHER PUBLICATIONS

May 21, 2019, International Search Report issued for related PCT application No. PCT/JP2019/009281.
(Continued)

*Primary Examiner* — James J Lee
*Assistant Examiner* — Andrew Sang Kim
(74) *Attorney, Agent, or Firm* — Paratus Law Group, PLLC (57) ABSTRACT

The purpose of the present invention is to provide a work vehicle with which it is difficult for an operator to lose a sense of directionality even when the operator performs an operation while seeing an image of a remote control terminal. In a work vehicle (crane 1) which is provided with: a traveling body (2); a boom (7) supported by the traveling body (2); and a camera (61) supported by the boom (7), and which can guide a pivot operation of the boom (7) by means of a remote control terminal (70), an image display device (73) is provided in the remote control terminal (70) and a control device (20) is provided which is capable of recognizing the support direction of the camera (61) by the boom (7) and an angle α of a location direction of the remote control terminal (70) with respect to the camera (61),
(Continued)

whereby an image rotated on the basis of the angle (α) and cut in a circular shape is displayed on the image display device (73).

6 Claims, 11 Drawing Sheets

(51) Int. Cl.
  *G06T 3/60* (2024.01)
  *G06T 7/70* (2017.01)
  *H04N 7/18* (2006.01)
  *H04N 23/54* (2023.01)
  *H04N 23/69* (2023.01)

(52) U.S. Cl.
  CPC ............ *H04N 7/183* (2013.01); *H04N 23/54* (2023.01); *H04N 23/69* (2023.01); *B66C 2700/0371* (2013.01); *G06T 2207/30252* (2013.01)

(58) Field of Classification Search
  CPC . G06T 7/70; G06T 2207/30252; H04N 7/183; H04N 23/54; H04N 23/69; E04G 21/14
  See application file for complete search history.

(56) References Cited

U.S. PATENT DOCUMENTS

| | | | |
|---|---|---|---|
| 2016/0119589 A1* | 4/2016 | Tanizumi | H04N 23/635 345/173 |
| 2018/0148302 A1 | 5/2018 | Hayashi | |

OTHER PUBLICATIONS

May 21, 2019, International Search Opinion issued for related PCT application No. PCT/JP2019/009281.

\* cited by examiner

WORK VEHICLE HAVING AN OPERATION TERMINAL THAT PROVIDES A SENSE OF DIRECTION FOR AN OPERATOR

CROSS REFERENCE TO PRIOR APPLICATION

This application is a National Stage Patent Application of PCT International Patent Application No. PCT/JP2019/009281 (filed on Mar. 8, 2019) under 35 U.S.C. § 371, which claims priority to Japanese Patent Application No. 2018-043249 (filed on Mar. 9, 2018), which are all hereby incorporated by reference in their entirety.

TECHNICAL FIELD

The present invention relates to work vehicles. Specifically, the present invention relates to a work vehicle in which an operator does not easily lose a sense of direction, even when performing an operation while watching an image on a remote operation terminal.

BACKGROUND ART

Conventionally, cranes are known to be typical working vehicles. The crane is mainly composed of a traveling body and a swivel body. The traveling body is provided with a plurality of wheels and is configured to travel freely. The swiveling body includes, in addition to a boom, a winch and a hook and is configured to carry a load freely.

There is a crane in which a swiveling operation of a boom can be instructed by a remote operation terminal (refer to Patent Literature 1). In addition, there is a crane in which a camera that takes an image of a work site from above is provided and in which an image of the work site can be displayed on an image display (refer to Patent Literature 2). There is however a problem that, when the image display is provided in a portable remote operation terminal, the relative position of the remote operation terminal relative to the camera changes with the movement of an operator, and therefore, the operator loses a sense of direction when performing an operation while watching an image on the remote operation terminal. It is considered that the same applies to the other work vehicles in which an image of a work site is taken from above. Thus, a work vehicle in which an operator does not easily lose a sense of direction, even when performing an operation while watching an image on a remote operation terminal, has been desired.

CITATION LIST

Patent Literature

PTL 1
Japanese Patent Application Laid-Open No. 2017-065911
PTL 2
Japanese Patent Application Laid-Open No. 2016-179889

SUMMARY OF INVENTION

Technical Problem

A work vehicle in which an operator does not easily lose a sense of direction, even when performing an operation while watching an image on a remote operation terminal, is provided.

Solution to Problem

A work vehicle according to the present invention includes:

a traveling body;
a boom supported by the traveling body; and
a camera supported by the boom,
the work vehicle being configured such that a swiveling operation of the boom is instructed by a remote operation terminal, wherein:
the remote operation terminal includes an image display;
a control apparatus capable of recognizing an angle is included, the angle being formed by a supporting direction of the camera by the boom and a position direction of the remote operation terminal relative to the camera; and
an image rotated based on the angle and cut into a circular shape is displayed on the image display.

In the work vehicle according to the present invention, a mark indicating the position direction of the remote operation terminal is displayed on an image taken by the camera.

In the work vehicle according to the present invention, a mark indicating a position direction of the traveling body is displayed on an image taken by the camera.

The work vehicle according to the present invention further includes:
an azimuth indicator, wherein
a mark indicating an azimuth is displayed on an image taken by the camera.

In the work vehicle according to the present invention, an extension/retraction operation of the boom is allowed to be instructed by the remote operation terminal;
a zoom magnification of the camera is increased when the camera is lifted; and
the zoom magnification of the camera is decreased when the camera is lowered.

In the work vehicle according to the present invention, a luffing operation of the boom is allowed to be instructed by the remote operation terminal;
a zoom magnification of the camera is increased when the camera is lifted; and
the zoom magnification of the camera is decreased when the camera is lowered.

Advantageous Effects of Invention

According to the work vehicle according to the present invention, the remote operation terminal includes the image display, and the control apparatus configured to recognize an angle is included. The angle is formed by a supporting direction of the camera by the boom and a position direction of the remote operation terminal relative to the camera. An image rotated based on the angle and cut into a circular shape is displayed on the image display. According to such a work vehicle, even when the relative position of the remote operation terminal relative to the camera changes with the movement of an operator, an image rotated as appropriate and having no omission is displayed on the image display. Consequently, the operator does not easily lose a sense of direction, even when performing an operation while watching an image on the remote operation terminal.

According to the work vehicle according to the present invention, a mark indicating the position direction of the remote operation terminal is displayed on an image taken by the camera. According to such a work vehicle, an operator does not easily lose a sense of direction, even when performing an operation while watching an image on the remote operation terminal, because the position direction of the remote operation terminal on the image is known.

According to the work vehicle according to the present invention, a mark indicating a position direction of the traveling body is displayed on an image taken by the camera. According to such a work vehicle, an operator does not easily lose a sense of direction, even when performing an operation while watching an image on the remote operation terminal, because the position direction of the traveling body on the image is known.

According to the work vehicle according to the present invention, the azimuth indicator is included. A mark indicating an azimuth is displayed on an image taken by the camera. According to such a work vehicle, an operator does not easily lose a sense of direction, even when performing an operation while watching an image on the remote operation terminal, because azimuths on the image are known.

According to the work vehicle according to the present invention, the extension/retraction operation of the boom can be instructed by the remote operation terminal. When the camera is lifted, a zoom magnification of the camera is increased. When the camera is lowered, the zoom magnification of the camera is decreased. According to such a work vehicle, an operator does not easily lose a sense of direction, even when performing an operation while watching an image on the remote operation terminal, because the positions of planimetric features and the like on the image are also easily confirmed.

According to the work vehicle according to the present invention, a luffing operation of the boom can be instructed by the remote operation terminal. When the camera is lifted, a zoom magnification of the camera is increased. When the camera is lowered, the zoom magnification of the camera is decreased. According to such a work vehicle, an operator does not easily lose a sense of direction, even when performing an operation while watching an image on the remote operation terminal, because the positions of planimetric features and the like on the image are also easily confirmed.

DESCRIPTION OF EMBODIMENTS

In the present application, a crane, which is a representative work vehicle, will be described. The technical concept disclosed in the present application is also applicable to, in addition to crane 1 described below, other cranes.

Figure 1:
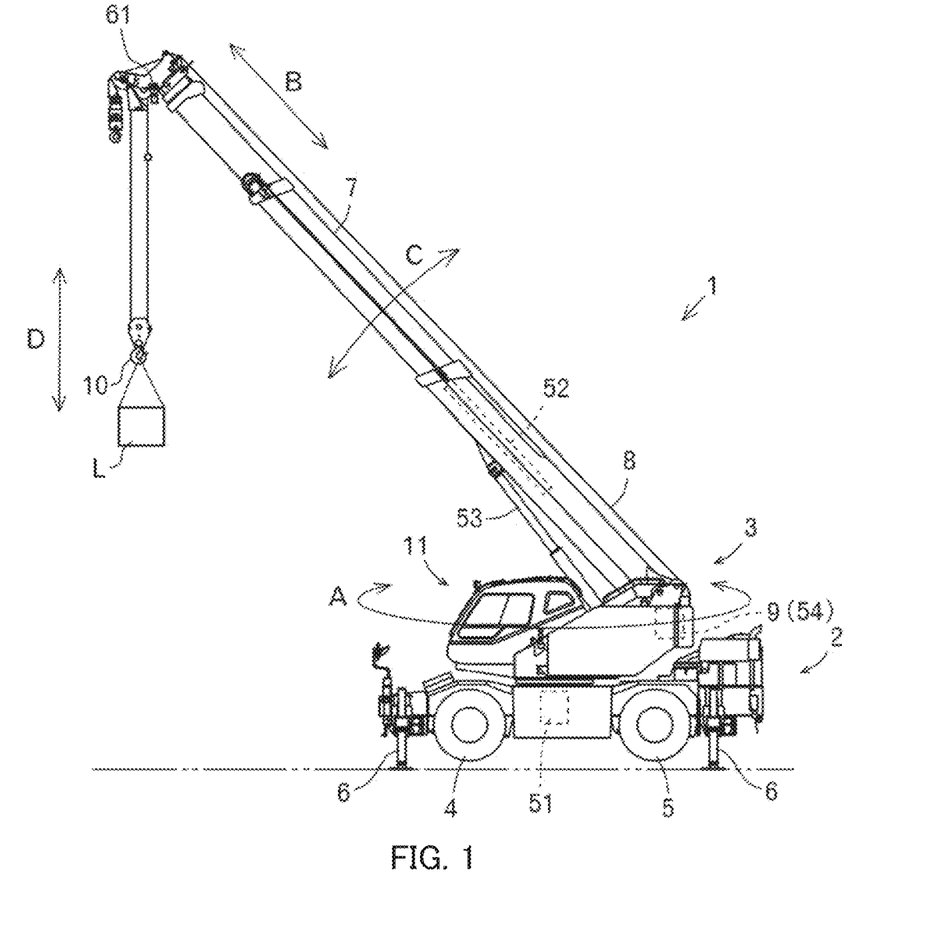
FIG. 1 illustrates a crane.
Figure 2:
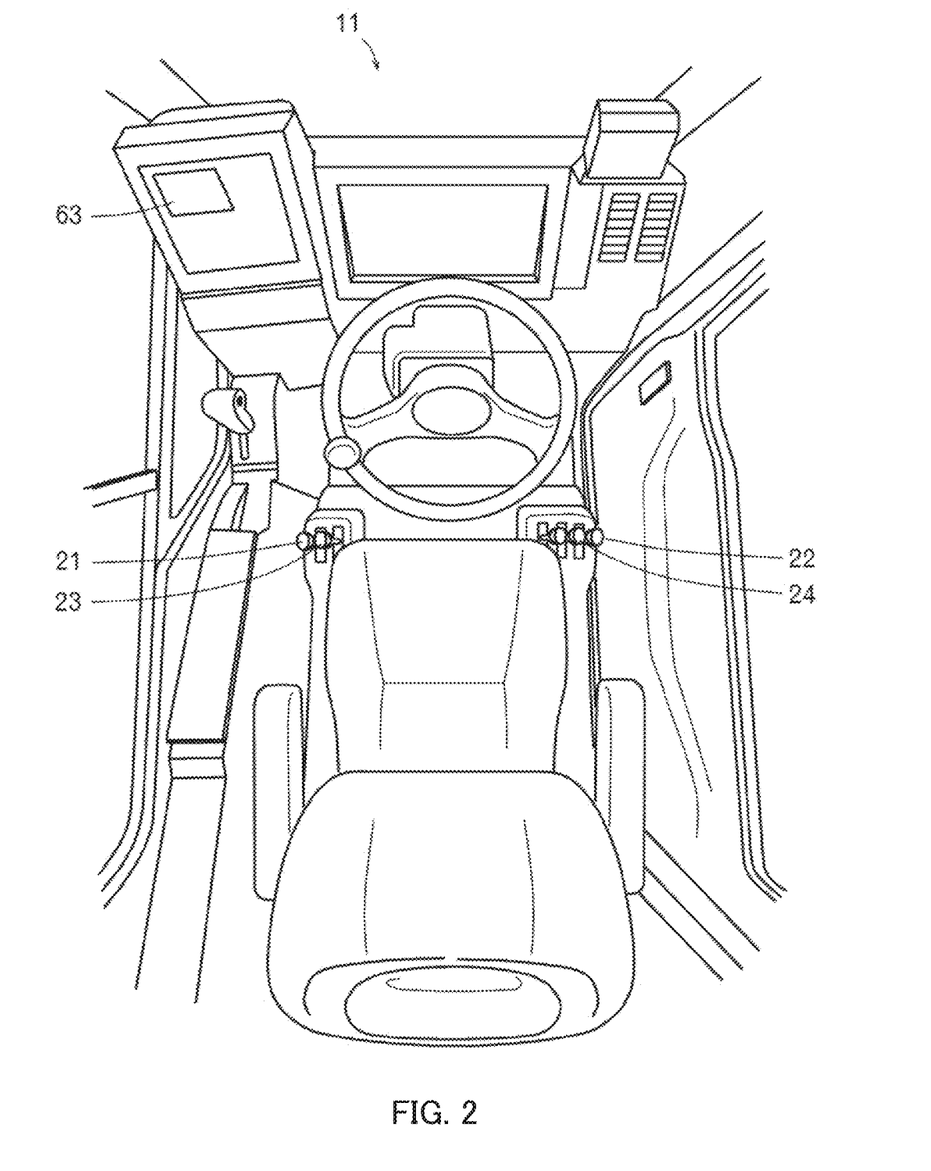
FIG. 2 illustrates an inner portion of a cabin.

First, with reference to FIG. 1 and FIG. 2, crane 1 will be described.

Crane 1 is constituted by, mainly, traveling body 2 and swiveling body 3.

Traveling body 2 includes a left-right pair of front tires 4 and a left-right pair of rear tires 5. Traveling body 2 also includes outriggers 6 that are grounded for stabilization when carrying work of load L is performed. Traveling body 2 supports swiveling body 3 on an upper portion thereof and is able to swivel swiveling body 3 by an actuator.

Swiveling body 3 includes boom 7 projecting forward from a rear portion thereof. Thus, boom 7 is able to be swiveled (refer to arrow A) by an actuator. Boom 7 is also extendable and retractable (refer to arrow B) by an actuator. Moreover, boom 7 is able to be luffed up (refer to arrow C) by an actuator. In addition, wire 8 is stretched around boom 7. On the base end side of boom 7, winch 9 around which wire 8 is wound is disposed, and on the distal end side of boom 7, hook 10 is hung by wire 8. Winch 9 is configured to be integral with an actuator and enables winding in and winding out of wire 8. Therefore, hook 10 is able to be lifted and lowered (refer to arrow D) by the actuator. Swiveling body 3 includes cabin 11 at the side of boom 7. In an inner portion of cabin 11, there are disposed swivel manipulation tool 21, extension/retraction manipulation tool 22, luffing manipulation tool 23, and winding manipulation tool 24. Further, image display 63, which will be described later, is disposed.

Figure 3:
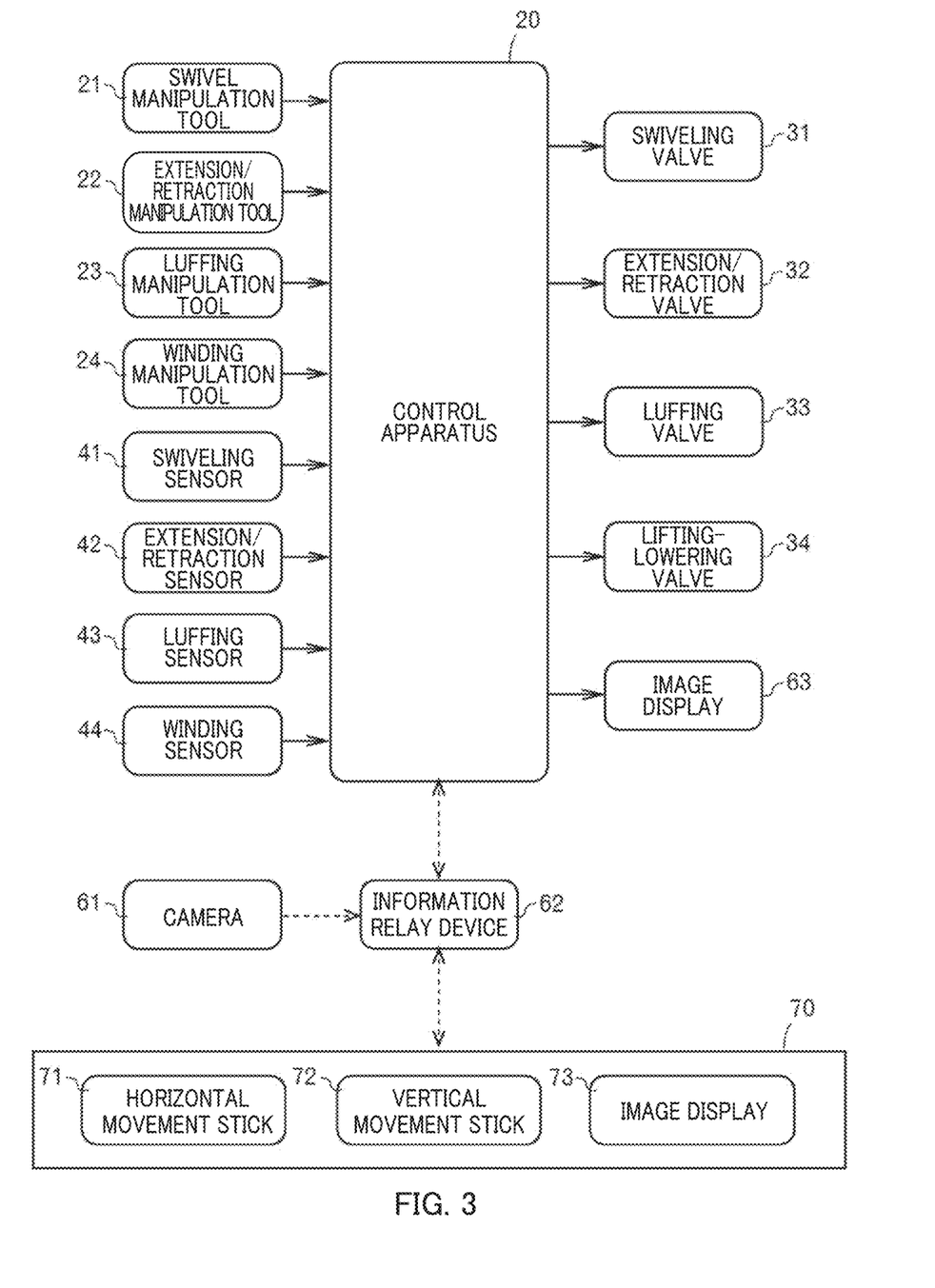
FIG. 3 is a block diagram illustrating a configuration of an image display system.
Figure 4:
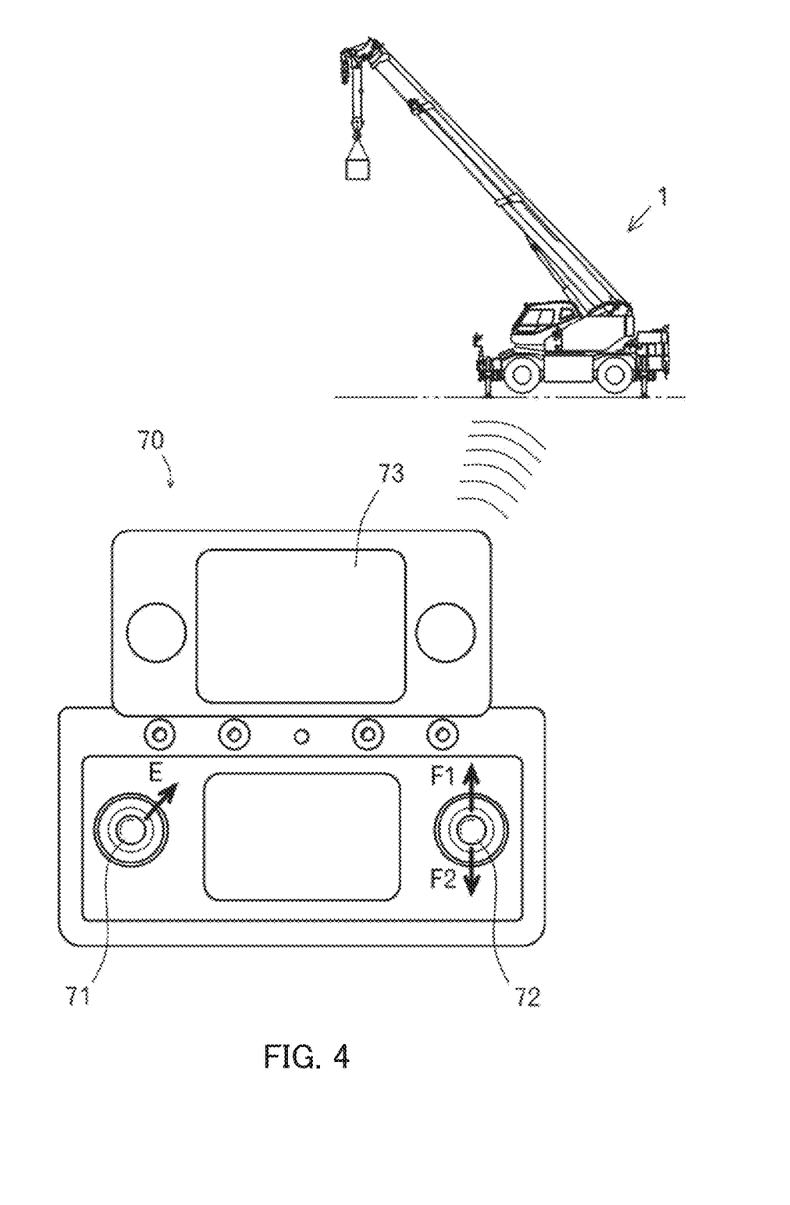
FIG. 4 illustrates a remote operation terminal.
Figure 5:
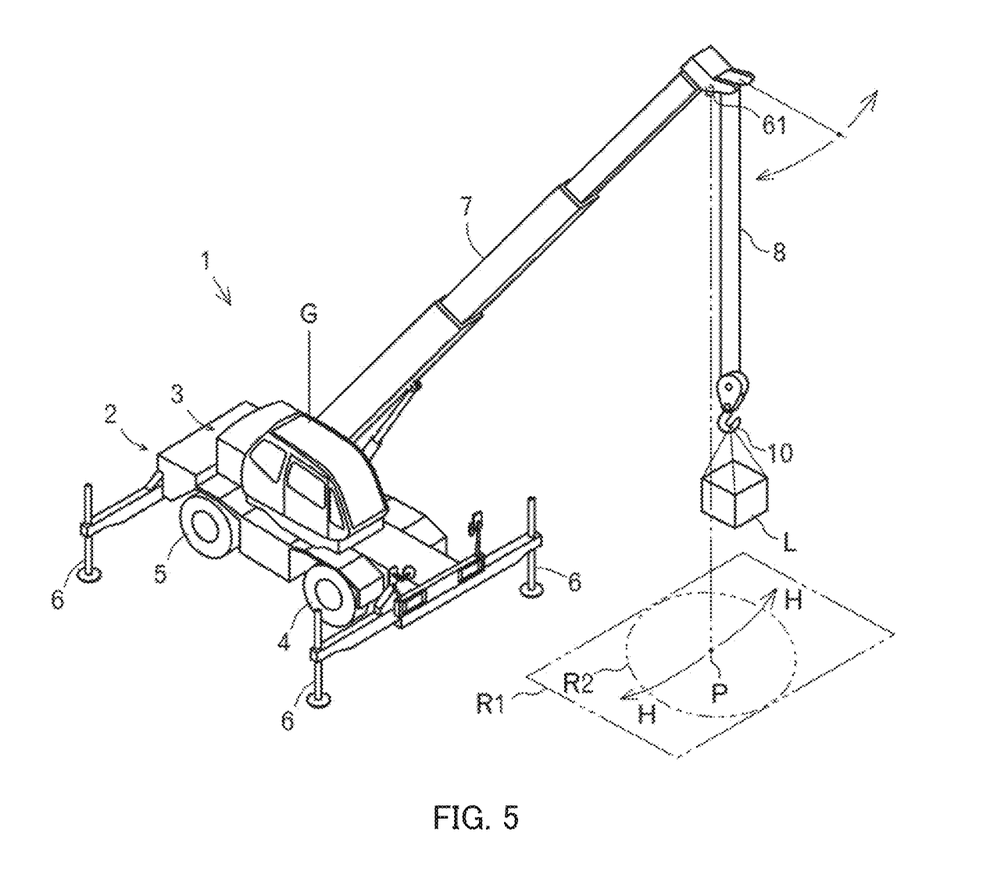
FIG. 5 illustrates a swiveling operation of a boom.

Next, with reference to FIG. 3 and FIG. 4, an image display system will be described. The image display system is, however, an example of a conceivable configuration and is not limited thereto.

The image display system is constituted by, mainly, control apparatus 20. Various types of manipulation tools 21 to 24 are connected to control apparatus 20. In addition, various types of valves 31 to 34 are connected to control apparatus 20. Further, various types of sensors 41 to 44 are connected to control apparatus 20.

As described above, boom 7 is able to be swiveled (refer to arrow A in FIG. 1) by an actuator. In the present application, such an actuator is defined as hydraulic swivel motor 51. Hydraulic swivel motor 51 is operated, as appropriate, by swiveling valve 31, which is a direction control valve. In other words, hydraulic swivel motor 51 is operated, as appropriate, in response to swiveling valve 31 switching the flow direction of a hydraulic oil. Swiveling valve 31 is operated on the basis of the operation of swivel manipulation tool 21 by an operator. The swiveling angle and the swiveling speed of boom 7 are detected by swiveling sensor 41. Thus, control apparatus 20 can recognize the swiveling angle and the swiveling speed of boom 7.

As described above, boom 7 is extendable and retractable (refer to arrow B in FIG. 1) by an actuator. In the present application, such an actuator is defined as extension/retraction hydraulic cylinder 52. Extension/retraction hydraulic cylinder 52 is operated, as appropriate, by extension/retraction valve 32, which is a direction control valve. In other words, extension/retraction hydraulic cylinder 52 is operated, as appropriate, in response to extension/retraction valve 32 switching the flow direction of the hydraulic oil or controlling the flow rate of the hydraulic oil. Extension/retraction valve 32 is operated on the basis of the operation of extension/retraction manipulation tool 22 by an operator. The extension/retraction length and the extension/retraction speed of boom 7 are detected by extension/retraction sensor 42. Thus, control apparatus 20 can recognize the extension/retraction length and extension/retraction speed of boom 7.

Further, as described above, boom 7 is able to be luffed up (refer to arrow C in FIG. 1) by an actuator. In the present application, such an actuator is defined as luffing hydraulic cylinder 53. Luffing hydraulic cylinder 53 is operated, as appropriate, by luffing valve 33, which is a direction control valve. In other words, luffing hydraulic cylinder 53 is operated, as appropriate, in response to luffing valve 33 switching the flow direction of the hydraulic oil or controlling the flow rate of the hydraulic oil. Luffing valve 33 is operated on the basis of the operation of luffing manipulation tool 23 by an operator. The luffing angle and the luffing speed of boom 7 are detected by luffing sensor 43. Thus, control apparatus 20 can recognize the luffing angle and the luffing speed of boom 7.

In addition, as described above, hook 10 is able to be lifted and lowered (refer to arrow D in FIG. 1) by an actuator. In the present application, such an actuator is defined as hydraulic winding motor 54. Hydraulic winding motor 54 is operated, as appropriate, by lifting-lowering valve 34, which is a direction control valve. In other words, hydraulic winding motor 54 is operated, as appropriate, in response to lifting-lowering valve 34 switching the flow direction of the hydraulic oil or controlling the flow rate of the hydraulic oil. Lifting-lowering valve 34 is operated on the basis of the operation of winding manipulation tool 24 by an operator. The hanging length and the lifting-lowering speed of hook 10 are detected by winding sensor 44. Thus, control apparatus 20 can recognize the hanging length and the lifting-lowering speed of hook 10.

Further, the image display system includes camera 61, information relay device 62, and image display 63.

Camera 61 is configured to take an image. Camera 61 is mounted on a distal end portion of boom 7 to take an image of a work site from above (refer to FIG. 1). Camera 61 is connected to information relay device 62.

Information relay device 62 is configured to send and receive information converted into a radio signal. At least an antenna of information relay device 62 is mounted on a distal end portion of boom 7 to reduce an influence of planimetric features and the like onto radio waves. Information relay device 62 is connected to, in addition to control apparatus 20, remote operation terminal 70, which will be described later. Therefore, information relay device 62 can transmit information from control apparatus 20 to remote operation terminal 70. Information relay device 62 can also transmit information from remote operation terminal 70 to control apparatus 20. Further, it is also possible to transmit an image taken by camera 61 to control apparatus 20 and remote operation terminal 70.

Image display 63 is configured to display various images. Image display 63 is mounted on a front side in an inner portion of cabin 11 so that an operator can visually recognize image display 63 while operating the various types of manipulation tools 21 to 24 (refer to FIG. 2). Image display 63 is connected to control apparatus 20. Therefore, control apparatus 20 can provide information to an operator through image display 63.

In addition, the image display system includes remote operation terminal 70. Remote operation terminal 70 includes a transmitter and a receiver, which are not illustrated. Remote operation terminal 70 in the present application is an example of a remote operation terminal and is not limited thereto.

Remote operation terminal 70 includes horizontal movement stick 71. When an operator tilts (refer to arrow E in FIG. 4) horizontal movement stick 71 in a direction, hook 10 or load L that is hung on hook 10 moves toward a tilted direction. In other words, when an operator tilts horizontal movement stick 71 in a direction, hydraulic swivel motor 51, extension/retraction hydraulic cylinder 52, luffing hydraulic cylinder 53 are operated in association with each other, as appropriate, and hook 10 or load L hung on hook 10 moves.

Remote operation terminal 70 also includes vertical movement stick 72. When an operator tilts (refer to arrow F1 in FIG. 4) vertical movement stick 72 forward, hook 10 or load L hung on hook 10 moves upward. When an operator tilts (refer to arrow F2 in FIG. 4) vertical movement stick 72 rearward, hook 10 or load L hung on hook 10 moves downward. In other words, when an operator tilts vertical movement stick 72 in one direction, hydraulic winding motor 54 is operated, and hook 10 or load L hung on hook 10 moves upward or downward.

According to such remote operation terminal 70, it is possible for an operator to perform an operation with respect to hook 10 or load L hung on hook 10, instead of performing an operation with respect to boom 7 and winch 9. Consequently, a movement direction of hook 10 or load L hung on hook 10 is directly instructed, and boom 7 and winch 9 are operated so as to execute the instruction.

In addition, remote operation terminal 70 includes image display 73. Image display 73 is mounted on the front side on the upper surface of remote operation terminal 70 so that an operator can visually recognize image display 73 while operating horizontal movement stick 71 and vertical movement stick 72. Image display 73 is connected to control apparatus 20 via a radio signal. Therefore, control apparatus 20 can provide information to an operator through image display 73.

Figure 6:
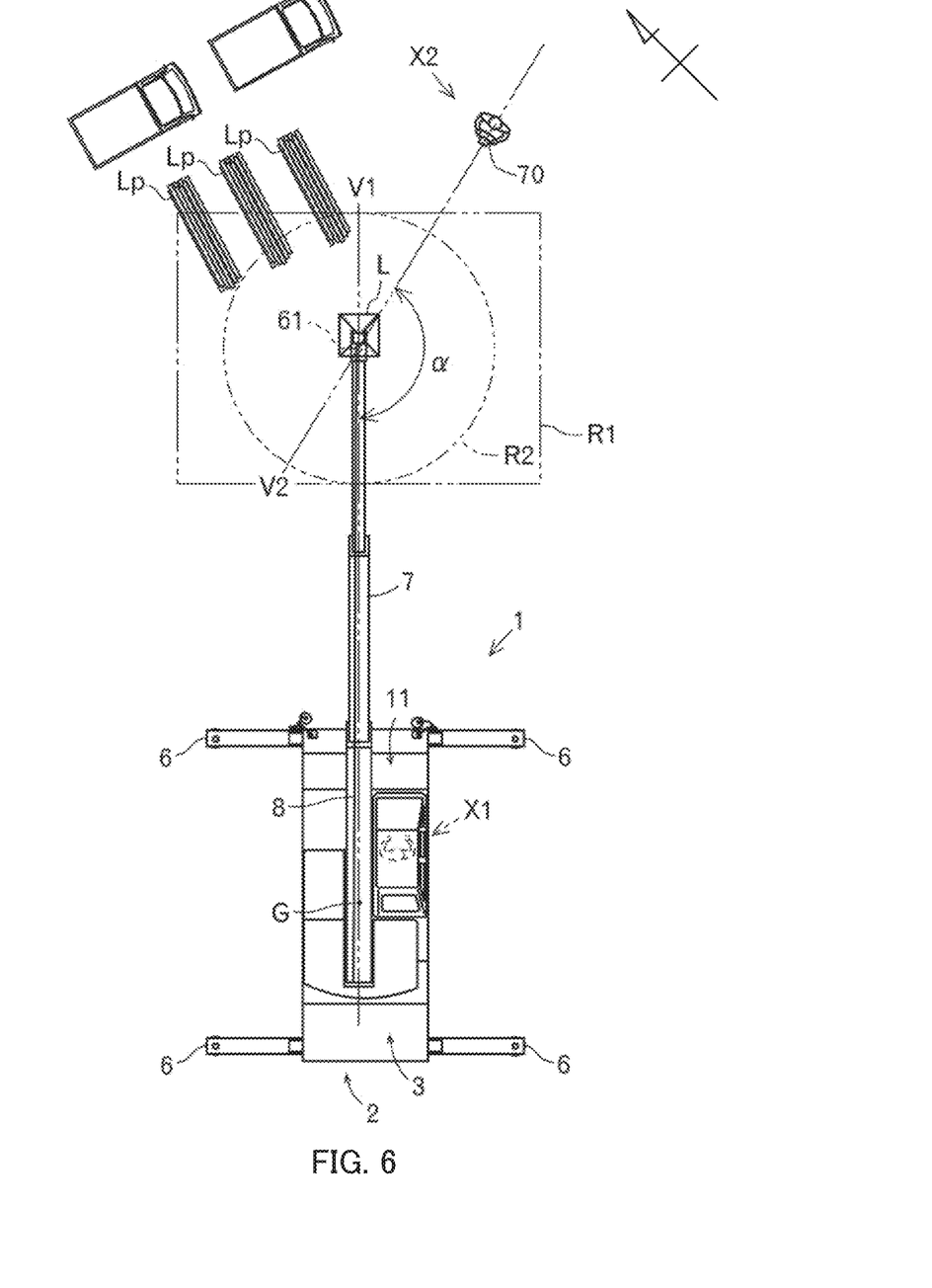
FIG. 6 illustrates a state before a boom is swiveled.
Figure 8:
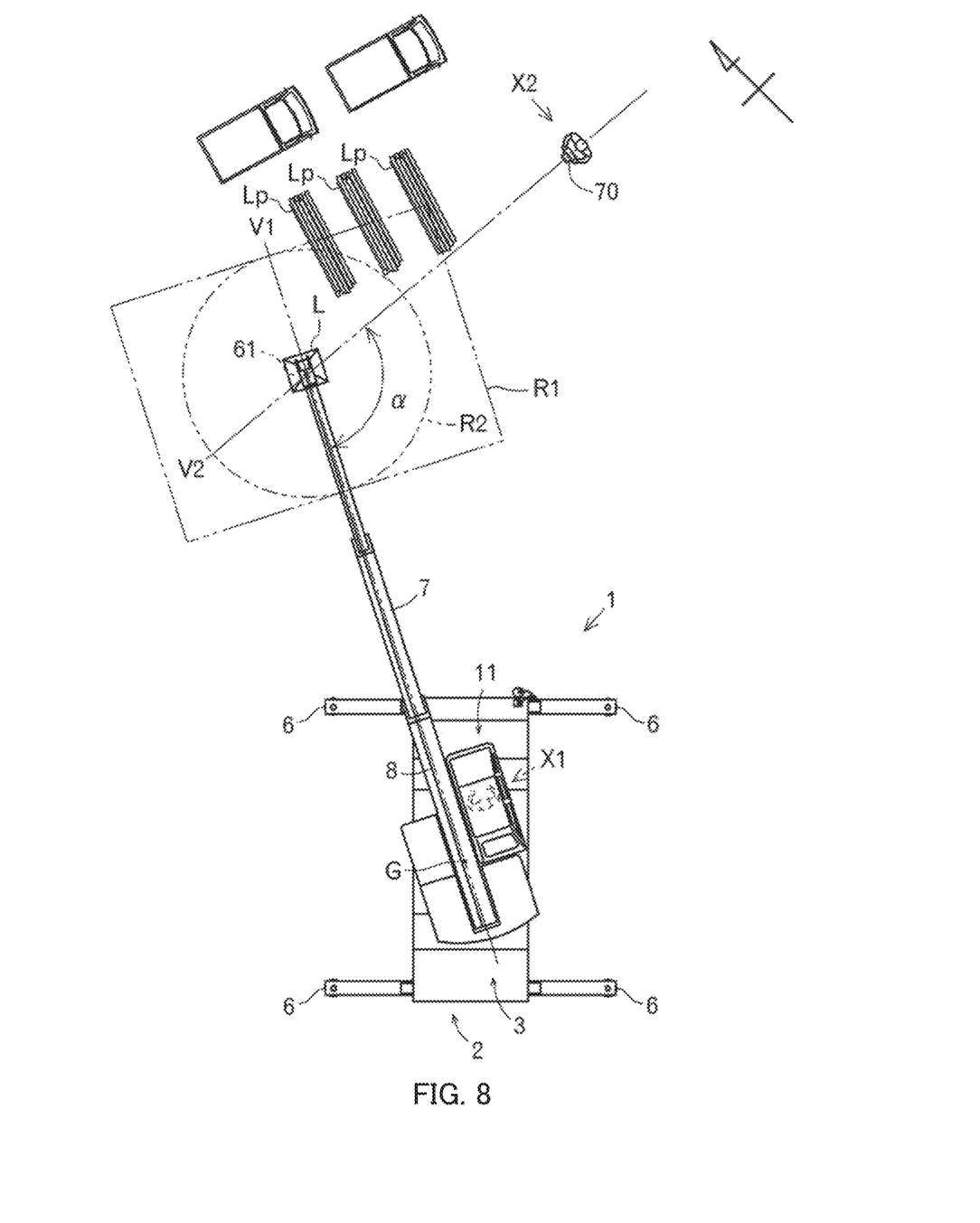
FIG. 8 illustrates a state after a boom is swiveled.
Figure 9A:
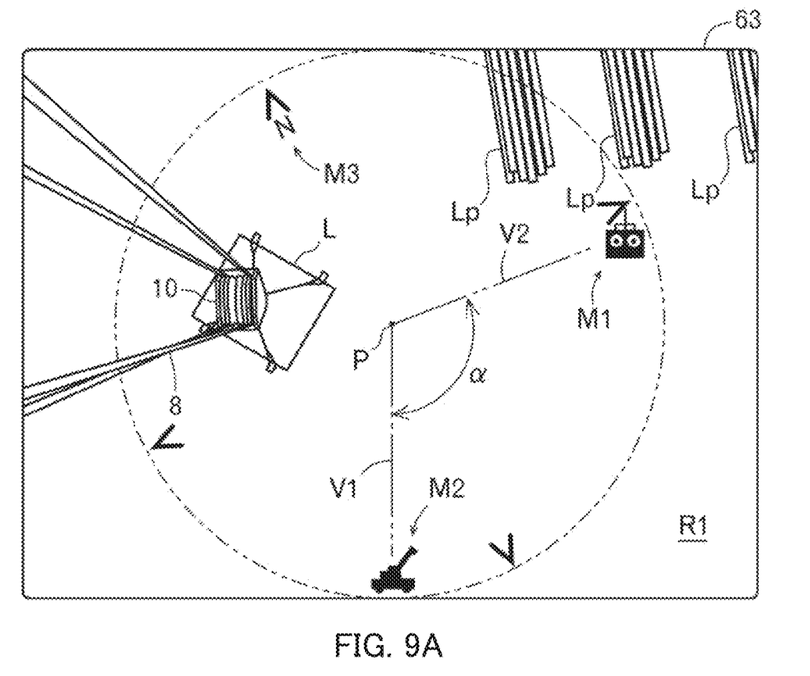
FIGS. 9A and 9B illustrate a display mode after a boom is swiveled.
Figure 9B:
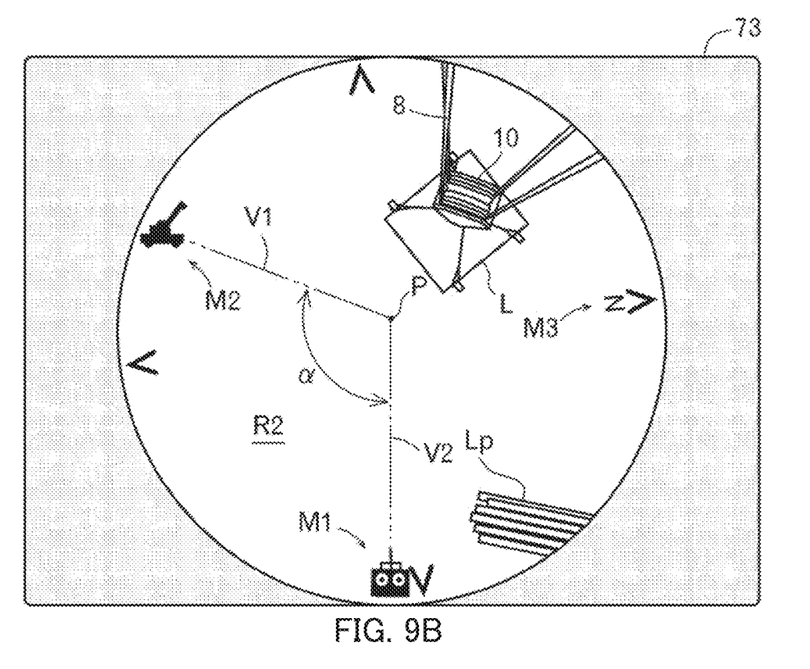

Control apparatus 20 is configured to recognize the position of remote operation terminal 70. This can be realized by providing the antenna of information relay device 62 with directional characteristics. As described above, control apparatus 20 can recognize the swiveling angle, the extension/retraction length, the luffing angle of boom 7. Thus, control apparatus 20 can also recognize the position of camera 61. Consequently, control apparatus 20 can recognize angle α (refer to FIG. 6 and FIG. 8) formed by a supporting direction of camera 61 by boom 7 and a position direction of remote operation terminal 70 relative to camera 61. The "supporting direction of camera 61 by boom 7" is a direction along virtual line V1 (refer to FIG. 6 and FIG. 8) connecting swiveling center G of boom 7 and camera 61 when viewed from above. The "position direction of remote operation terminal 70 relative to camera 61" is a direction along virtual line V2 (refer to FIG. 6 and FIG. 8) connecting camera 61 and remote operation terminal 70 when viewed from above. In addition, control apparatus 20 is connected to an azimuth indicator (not illustrated) and is configured to be able to recognize azimuths. The azimuths in the present application are indicated by an azimuth mark in FIG. 6 and FIG. 8.

Next, with reference to FIG. 5 to FIGS. 9A and 9B, a display mode of image displays 63 and 73 will be described. Here, description will be provided with an operator who performs an operation while riding on crane 1 being referred to as "operator X1" and an operator who performs an operation without riding on crane 1 being referred to as "operator X2".

As described above, boom 7 swivels in response to an operation of swivel manipulation tool 21 by operator X1 or an operation of horizontal movement stick 71 by operator X2. At this time, camera 61 swivels together with boom 7. Then, target point P of camera 61 also swivels (refer to arrow H in FIG. 5) together with boom 7, and image regions R1 and R2 centered on target point P also swivel.

It is assumed that, before boom 7 swivels, load Lp placed on the ground is included (refer to FIG. 6) inside image region R1. Image region R1 is displayed (refer to FIG. 7A) on image display 63 disposed in an inner portion of cabin 11. Image region R1 has a rectangular shape inscribed in an image-taking range of camera 61. This is as a result of considering so that surroundings of hook 10 or load L hung on hook 10 are widely viewed.

It is assumed that, at the same time, load Lp placed on the ground is also included (refer to FIG. 6) inside image region R2 before boom 7 swivels. Image region R2 is displayed (refer to FIG. 7B) on image display 73 disposed on the upper surface of remote operation terminal 70. Image region R2 has a circular shape inscribed in image region R1. This is as a result of considering, in addition to that an omission (partial omission of an image) does not occur even when the image is rotated, that it is possible to enable operator X2 to recognize again that the image is displayed by being rotated. Such an image is rotated on the basis of formed angle α. This is because the image becomes an image that is easiest for operator X2 to recognize directions.

As above, crane 1 includes image display 73 disposed on remote operation terminal 70 and includes control apparatus 20 that can recognize angle α formed by a supporting direction of camera 61 by boom 7 and a position direction of remote operation terminal 70 relative to camera 61. An image rotated on the basis of angle α and cut to a circular shape is displayed on image display 73. According to such crane 1, even when the relative position of remote operation terminal 70 relative to camera 61 charges with the movement of an operator, an image rotated as appropriate and having no omission is displayed on image display 73. Consequently, operator X2 does not easily lose a sense of direction, even when performing an operation while watching an image on remote operation terminal 70.

Next, another feature of crane 1 will be described.

In crane 1, control apparatus 20 can recognize the position direction of remote operation terminal 70 (refer to virtual line V2 in FIG. 6 to FIGS. 9A and 9B). Therefore, control apparatus 20 can display, on an image on image display 73, mark M1 indicating the position direction of remote operation terminal 70 (refer to FIG. 7B).

Thus, in crane 1, mark M1 indicating the position direction of remote operation terminal 70 is displayed on an image taken by camera 61. According to such crane 1, operator X2 does not easily lose a sense of direction, even when performing an operation while watching an image on remote operation terminal 70, because the position direction of remote operation terminal 70 on the image is known.

Figure 7A:
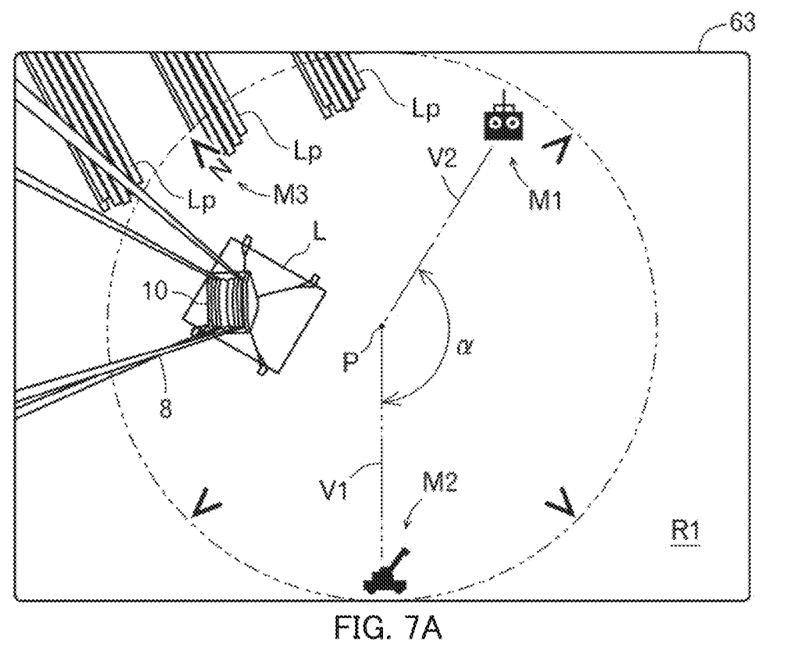
FIGS. 7A and 7B illustrate a display mode before a boom is swiveled.
Figure 7B:
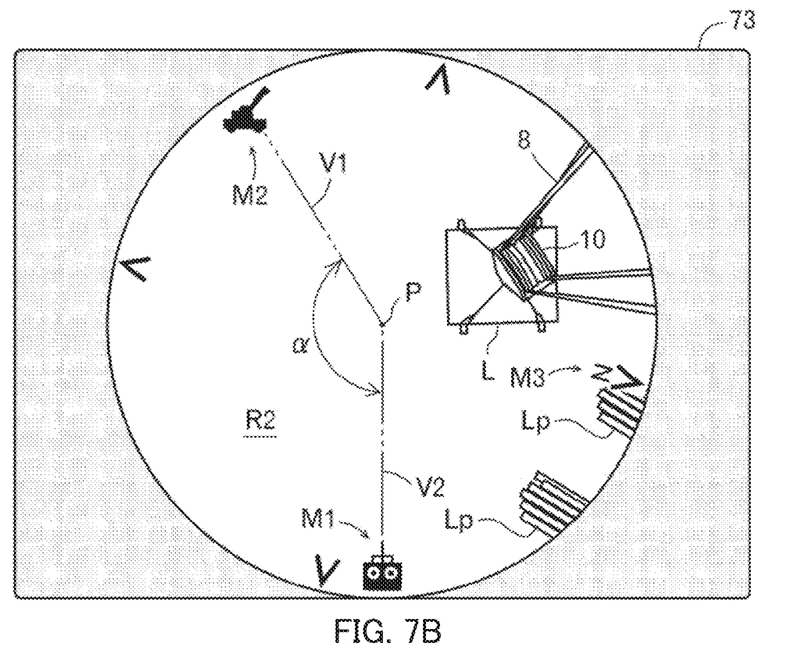

In this respect, mark M1 indicating the position direction of remote operation terminal 70 may be displayed on an image on image display 63 (refer to FIG. 7A). In this case, operator X1 can recognize the position direction of remote operation terminal 70. Consequently, operator X1 does not easily lose a sense of direction, even when performing an operation while watching an image on image display 63.

In crane 1, control apparatus 20 can recognize the position direction of traveling body 2 (refer to virtual line V1 in FIG. 6 to FIGS. 9A and 9B). Therefore, control apparatus 20 can display, on an image on image display 73, mark M2 indicating the position direction of traveling body 2 (refer to FIG. 7B).

Thus, in crane 1, mark M2 indicating the position direction of traveling body 2 is displayed on an image taken by camera 61. According to such crane 1, operator X2 does not easily lose a sense of direction, even when performing an operation while watching an image on remote operation terminal 70, because the position direction of traveling body 2 on the image is known.

In this respect, mark M2 indicating the position direction of traveling body 2 may be displayed on an image on image display 63 (refer to FIG. 7A). In this case, operator X1 can recognize the position direction of traveling body 2. Consequently, operator X1 does not easily lose a sense of direction, even when performing an operation while watching an image on image display 63.

Further, in crane 1, control apparatus 20 can recognize azimuths. Therefore, control apparatus 20 can display, on an image on image display 73, mark M3 indicating an azimuth (refer to FIG. 7B).

As above, crane 1 includes the azimuth indicator. Mark M3 indicating an azimuth is displayed on an image taken by camera 61. According to such crane 1, operator X2 does not easily lose a sense of direction, even when performing an operation while watching an image on remote operation terminal 70, because azimuths on the image are known.

In this respect, mark M3 indicating an azimuth may be displayed on an image on image display 63 (refer to FIG. 7A). In this case, operator X1 can recognize azimuths. Consequently, operator X1 does not easily lose a sense of direction, even when performing an operation while watching an image on image display 63.

Figure 10:
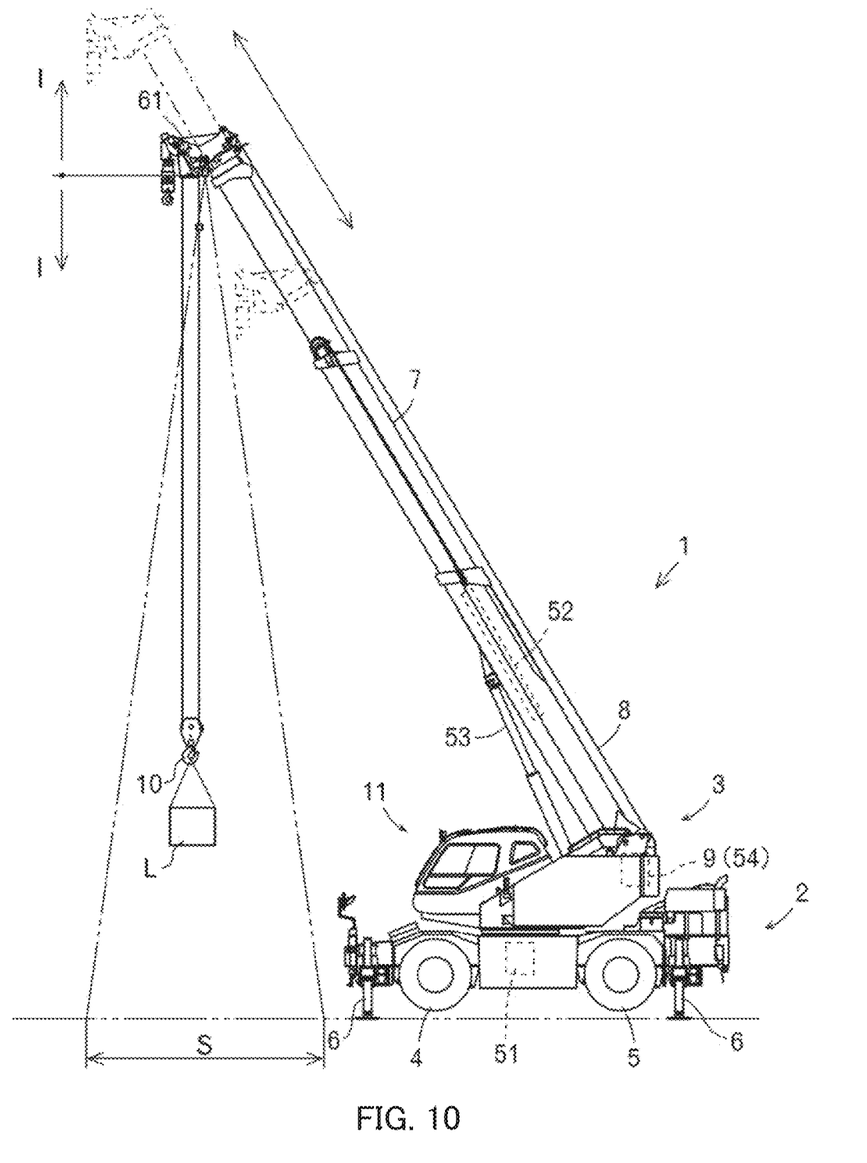
FIG. 10 illustrates a state in which a zoom magnification is adjusted in accordance with the extension/retraction operation of a boom.
Figure 11:
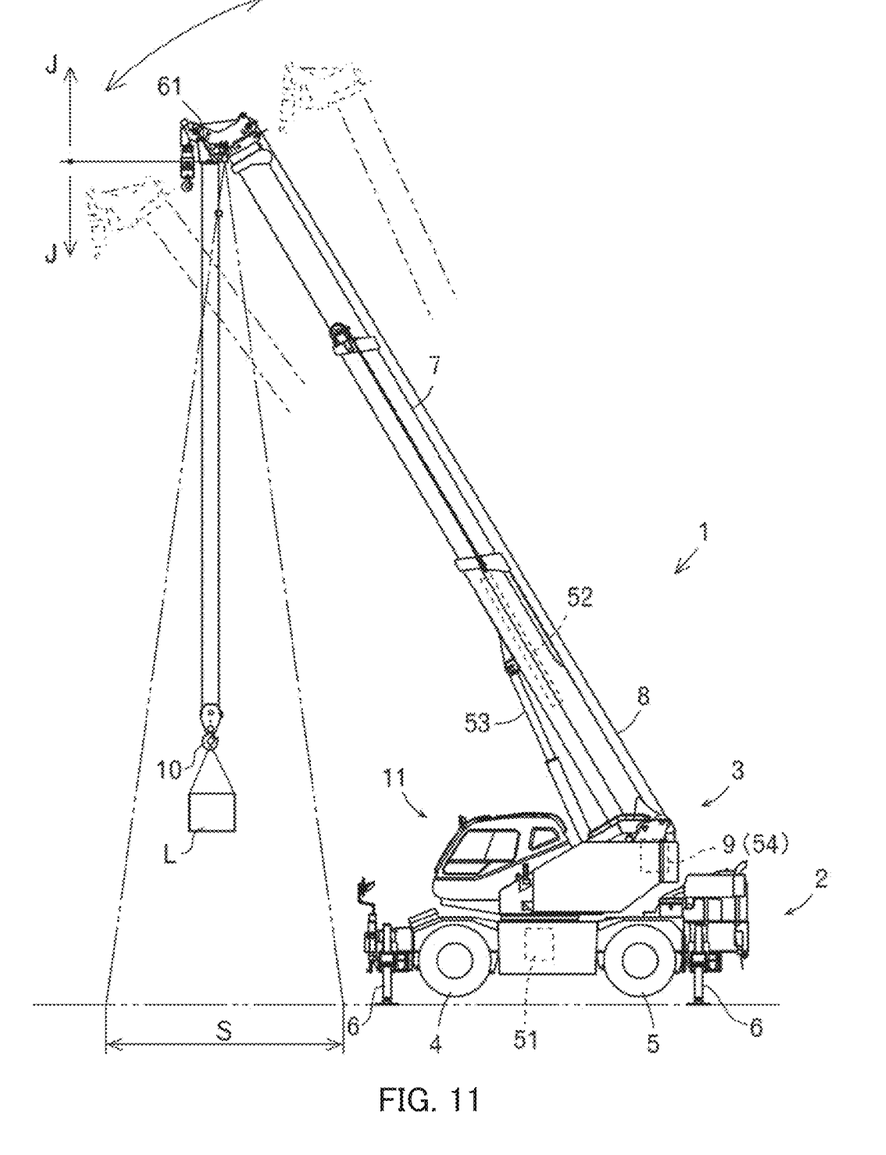
FIG. 11 illustrates a state in which a zoom magnification is adjusted in accordance with the luffing operation of a boom.

Next, with reference to FIG. 10 and FIG. 11, another feature will be described.

As described above, boom 7 extends and retracts in response to an operation of extension/retraction manipulation tool 22 by operator X1 or an operation of horizontal movement stick 71 by operator X2. At this time, camera 61 is moved by the extension/retraction operation of boom 7. Then, the height of camera 61 is changed by the extension/retraction operation of boom 7 (refer to arrow I in FIG. 10). For this, it is possible to adjust the zoom magnification so that image regions R1 and R2 do not change or do not largely change. For example, when image region R1 has a square shape whose each side has length S, it is possible to adjust the zoom magnification so that length S does not change or does not largely change.

As above, crane 1 is configured such that an extension/retraction operation of boom 7 can be instructed by remote operation terminal 70. When camera 61 is lifted, the zoom magnification of camera 61 is increased. When the camera is lowered, the zoom magnification of the camera is decreased. According to such crane 1, operator X2 does not easily lose a sense of direction, even when performing an operation while watching an image on remote operation terminal 70, because the positions of planimetric features and the like on the image are also easily confirmed.

In this respect, the same applies to image display 63. Consequently, operator X1 does not easily lose a sense of direction, even when performing an operation while watching an image on image display 63.

As described above, boom 7 is luffed up in response to an operation of luffing manipulation tool 23 by operator X1 or an operation of horizontal movement stick 71 by operator X2. At this time, camera 61 is moved by the luffing operation of boom 7. Then, the height of camera 61 is changed by the luffing operation of boom 7 (refer to arrow J in FIG. 11). For this, it is possible to adjust the zoom magnification so that image regions R1 and R2 do not change or do not largely change. For example, when image region R1 has a square shape whose each side has length S, it is possible to adjust the zoom magnification so that length S does not change or does not largely change.

As above, crane 1 is configured such that a luffing operation of boom 7 can be instructed by remote operation terminal 70. When camera 61 is lifted, the zoom magnification of camera 61 is increased. When the camera is lowered, the zoom magnification of the camera is decreased. According to such crane 1, operator X2 does not easily lose a sense of direction, even when performing an operation while watching an image on remote operation terminal 70, because the positions of planimetric features and the like on the image are also easily confirmed.

In this respect, the same applies to image display 63. Consequently, operator X1 does not easily lose a sense of direction, even when performing an operation while watching an image on image display 63.

Last, the technical concept disclosed in the present application is also applicable to the other work vehicles in which an image of a work site is taken from above. For example, the technical concept disclosed in the present application is also applicable to an aerial work platform, a concrete pump truck, and the like.

INDUSTRIAL APPLICABILITY

The present invention is usable for a work vehicle. Specifically, the present invention is usable for a work vehicle in which an operator does not easily lose a sense of direction, even when performing an operation while watching an image on a remote operation terminal.

REFERENCE SIGNS LIST

1 Crane (work vehicle)
2 Traveling body
3 Swiveling body
7 Boom
10 Hook
20 Control apparatus
61 Camera
70 Remote operation terminal
73 Image display
L Load
M1 mark
M2 mark
M3 mark
α angle

The invention claimed is:

1. A work vehicle being configured such that a swiveling operation of a boom is instructed by a remote operation terminal, the work vehicle comprising:
   a traveling body;
   the boom supported by the traveling body;
   a camera supported by the boom; and
   a control circuitry capable of recognizing an angle is included, the angle being formed by a supporting direction of the camera by the boom and a position direction of the remote operation terminal relative to the camera, wherein
   an image rotated based on the angle and cut into a circular shape is displayed on an image display provided in the remote operation terminal.

2. The work vehicle according to claim 1, wherein a mark indicating the position direction of the remote operation terminal is displayed on an image taken by the camera.

3. The work vehicle according to claim 1, wherein a mark indicating a position direction of the traveling body is displayed on an image taken by the camera.

4. The work vehicle according to claim 1, further comprising:
   an azimuth indicator, wherein
   a mark indicating an azimuth is displayed on an image taken by the camera.

5. The work vehicle according to claim 1, wherein:
   an extension/retraction operation of the boom is allowed to be instructed by the remote operation terminal;
   a zoom magnification of the camera is increased when the camera is lifted; and
   the zoom magnification of the camera is decreased when the camera is lowered.

6. The work vehicle according to claim 1, wherein:
   a luffing operation of the boom is allowed to be instructed by the remote operation terminal;
   a zoom magnification of the camera is increased when the camera is lifted; and
   the zoom magnification of the camera is decreased when the camera is lowered.

* * * * *